(No Model.)
E. H. CLARKE.
CLEAT FOR INSULATED WIRES.
No. 502,614. Patented Aug. 1, 1893.
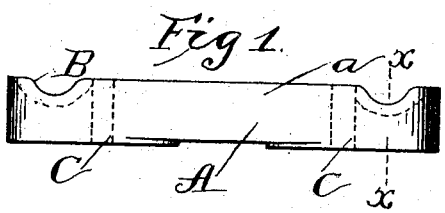
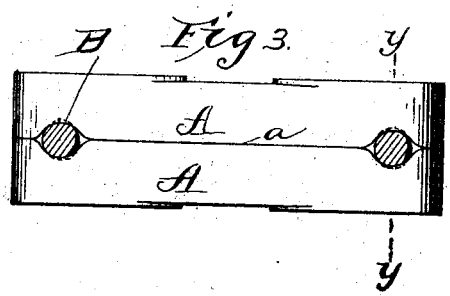
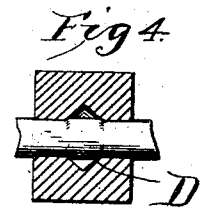
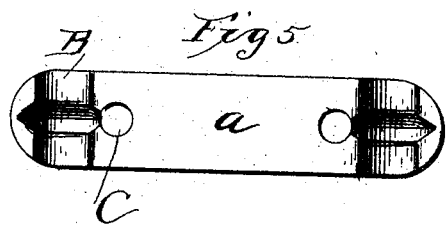
Attest
H. D. Maleton
F. L. Middleton
Inventor
Edward H. Clarke
by Ellis Spear
Atty.

United States Patent Office.

EDWARD H. CLARKE, OF LYNN, ASSIGNOR OF ONE-HALF TO SOLOMON EATON, OF BOSTON, MASSACHUSETTS.

CLEAT FOR INSULATED WIRES.

SPECIFICATION forming part of Letters Patent No. 502,614, dated August 1, 1893.

Application filed March 8, 1893. Serial No. 465,169. (No model.)

*To all whom it may concern:*

Be it known that I, EDWARD H. CLARKE, a citizen of the United States of America, residing at Lynn, in the county of Essex and State of Massachusetts, have invented certain new and useful Improvements in Cleats for Insulated Wires, of which the following is a specification.

My invention is an improved cleat or fastening for insulated electric wires, and the object of the invention is to provide an improved cleat which will securely hold the wire in position, but which is of such form that all liability of the abrasion of the insulating material with which the wire is covered is removed as there are no sharp edges which come in contact with the wire and thus wear away and penetrate the said insulation.

I have illustrated my invention in the accompanying drawings, in which—

Figure 1 represents a side elevation of one section of my improved cleat. Fig. 2 is a section on line $x$—$x$ of Fig. 1. Fig. 3 is a view of the two sections secured together as in use with the wire clamped between them. Fig. 4 is a section on line $y$—$y$ of Fig. 3. Fig. 5 is a plan view.

The cleat which is shown in the drawings is made in two sections or parts, which are precisely alike, and are represented at A, A. Each cleat has a semi-circular depression or groove, as at B, near each end for the reception of the wire, and the space between these grooves or depressions is made smooth and even so that the two sections may be placed together, as shown in Fig. 3, with these two smooth portions $a$, in contact. As the grooves coincide with each other, an opening or passageway is made through each end of the cleat through which the wire passes as shown in Fig. 3. Holes as at C, C, are made through the sections of the cleat through which the screws or nails are inserted by means of which the cleat is secured to the wall or similar support and the cleat sections clamped together.

In order to prevent the slipping of the wire in the cleat I have rounded out the center of each end of the cleat in the form of a longitudinal groove or channel extending across at right angles to the grooves B, and the edges of these depressions are rounded to remove the sharp edges and prevent any abrasion of the insulating material of the wire, as shown at D. The grooves B are made of such depth that the diameter of the opening or space between the walls when the two sections are placed together is slightly less than the diameter of the wire to be held, and when the sections are clamped tightly together some of the insulating material will be squeezed or extended into the longitudinal channels, and this will effectually prevent any displacement of the wires which will be held rigidly between the two sections of the cleat, while at the same time the absence of any sharp edge from contact with the wire will prevent the wearing away or abrasion of the insulating material. As the two sections are made precisely alike but one mold is necessary in the manufacture, and thus the cost of manufacture is reduced and a more simple and effectual article presented to the trade.

I claim as my invention—

As a new article of manufacture a wiring cleat composed of two parts, each part having correspondingly grooved ends, with grooves or depressions extending lengthwise of the cleats, located within the grooves of the ends, as described.

In testimony whereof I affix my signature in presence of two witnesses.

EDWARD H. CLARKE.

Witnesses:
C. H. WELCH,
RODNEY LUND.